United States Patent
Mitsui

(10) Patent No.: US 7,690,712 B2
(45) Date of Patent: Apr. 6, 2010

(54) ANTIDAZZLE APPARATUS FOR MOVABLE BODIES

(75) Inventor: Takao Mitsui, Chita-gun (JP)

(73) Assignee: DENSO CORPORATION, Kariya (JP)

( * ) Notice: Subject to any disclaimer, the term of this patent is extended or adjusted under 35 U.S.C. 154(b) by 513 days.

(21) Appl. No.: 11/606,135

(22) Filed: Nov. 30, 2006

(65) Prior Publication Data

US 2007/0126255 A1 Jun. 7, 2007

(30) Foreign Application Priority Data

Dec. 5, 2005 (JP) ............................. 2005-351176

(51) Int. Cl.
B60J 3/04 (2006.01)
(52) U.S. Cl. .................................... 296/97.2; 296/97.4
(58) Field of Classification Search .............. 296/96.19, 296/97.1, 97.2, 97.4; 250/203.4
See application file for complete search history.

(56) References Cited

U.S. PATENT DOCUMENTS

| | | | | |
|---|---|---|---|---|
| 5,714,751 | A * | 2/1998 | Chen | 250/203.4 |
| 7,134,707 | B2 * | 11/2006 | Isaac | 296/97.6 |
| 2003/0151272 | A1 * | 8/2003 | Sugimoto et al. | 296/146.2 |
| 2006/0175859 | A1 * | 8/2006 | Isaac | 296/97.4 |
| 2007/0210604 | A1 * | 9/2007 | Lin | 296/97.2 |

FOREIGN PATENT DOCUMENTS

| | | |
|---|---|---|
| JP | U-62-43923 | 3/1987 |
| JP | A-8-156586 | 6/1996 |
| JP | A-10-016555 | 1/1998 |
| JP | 2002-87060 A * | 3/2002 |
| JP | 2004-142645 | 5/2004 |
| JP | A-2004-314900 | 11/2004 |
| JP | A-2005-08058 | 1/2005 |
| JP | A-2005-024313 | 1/2005 |
| JP | A-2005-178484 | 7/2005 |

OTHER PUBLICATIONS

Machine translation of JP-2002-87060.*

* cited by examiner

*Primary Examiner*—Jason S Morrow
(74) *Attorney, Agent, or Firm*—Posz Law Group, PLC

(57) ABSTRACT

An antidazzle apparatus for movable bodies is capable of not hiding something a user wants to see while dimming sunlight. A transmissive display is disposed above ahead of a driver, and two dimmer portions are formed in the transmissive display. The dimmer portions are positioned on straight lines linking the driver's right and left eyes with the sun, respectively, and are set to sizes a bit larger than the sizes of the pupils. In this case, sunlight is dimmed by the dimmer portions. Nevertheless, lines of sight leading to an entity which is located much closer than the sun is and which the driver wants to see are not intercepted by the dimmer portions. This allows the driver to see the entity.

23 Claims, 6 Drawing Sheets

ANTIDAZZLE APPARATUS FOR MOVABLE BODIES

CROSS REFERENCE TO RELATED APPLICATION

This application is based on and incorporates herein by reference Japanese Patent Application No. 2005-351176 filed on Dec. 5, 2005.

FIELD OF THE INVENTION

The present invention relates to an antidazzle apparatus for movable bodies. The apparatus controls the positions or the like of two dimmer portions, which have specific shapes, for the purpose of preventing irradiation of sunlight to user's eyes and preserving a forward field of view.

BACKGROUND OF THE INVENTION

As one of related arts concerning light interception, Patent Document 1 has disclosed an art for detecting the direction of the sun using an optical sensor and intercepting sunlight, which propagates in the direction, using a sun visor. To be more specific, the art provides an electronic sun visor system including a solar position measuring instrument, a sun visor, and a control circuit. The solar position measuring instrument uses a sunlight angle-of-incidence sensor to detect the angles of the sun in the horizontal and vertical directions with respect to the vehicle. The sunlight angle-of-incidence sensor, which is fixed to the back of an inside rearview mirror in a vehicle, includes (i) multiple slits having angles that are sequentially varied at several steps in vertical and horizontal directions and (ii) multiple photoelectric converters (or optical sensors) disposed at the bottoms of the respective slits. The sun visor has an appropriate number of interceptive members, of which transmission and interception can be electrically controlled, juxtaposed lengthwise and broadwise. The control circuit selects any of the interceptive members included in the sun visor according to an output of the solar position measuring instrument and instructs the selected interceptive member to intercept light.

The related art described in the Patent Document 1 poses a problem in that the shape of the interceptive members is, as described later, so improper that part of a driver's field of view is also intercepted.

As a solution of the problem underlying the related art described in the Patent Document 1, Patent Document 2 has disclosed an antidazzle apparatus for vehicles that controls interceptive members included in a sun visor by utilizing the ability of a route guide system for vehicles so as to intercept sunlight alone.

The antidazzle apparatus for vehicles described in the Patent Document 2 includes: a sun visor that can form an interceptive portion having a predetermined shape through electrical control; and a route guide system that is mounted as a navigation system in a vehicle to inform an optimal driving route according to entered conditions. The route guide system searches in advance a traffic signal located at an intersection existing in the driving route, and also searches an intersection, of which traffic signal is hard to see because of dazzling sunlight, on the basis of the positional relationship of the vehicle relative to the sun. The route guide system supplies a control signal to form an interceptive portion, which is shaped to hide the sun and makes it possible to see the traffic signal, in the sun visor at a time point before the vehicle approaches the intersection of the traffic signal.

As for other related arts, Patent Document 3 has disclosed an art for controlling a sun visor according to an eyepoint, and Patent Document 4 has disclosed an art for producing a control signal that defines an interceptive area in a shield on the basis of the deduced position of the sun and the position of a region concerned. Patent Document 5 has disclosed an art using a circular sheet interceptor, and Patent Document 6 has disclosed an art for detecting a driver's eye.

Patent Document 1: JP-S62-43923 U
Patent Document 2: JP-3518002 B2
Patent Document 3: JP-H10-016555 A
Patent Document 4: JP-2005-008058 A
Patent Document 5: JP-2004-314900 A
Patent Document 6: JP-2005-024313 A An unsolved problem underlies the antidazzle apparatus for vehicles disclosed in the Patent Document 2. Specifically, although sunlight can be intercepted so that the indication of a traffic signal can be discerned, a traffic sign, a guide plate, other vehicles, and pedestrians other than the traffic signal may also be intercepted.

Moreover, the related arts described in the other patent documents cannot hide sunlight alone because the number of interceptive portions formed in a sun visor is one. For example, when the position of the indicator portion of a traffic signal relative to a driver lies in the same direction as the position of the sun does, and when an attempt is made to hide the sun, the indicator portion of the traffic signal, a traffic sign, an intersection name indicator, and pedestrians are all hidden.

SUMMARY OF THE INVENTION

The present invention is intended to break through the foregoing circumstances. An object of the present invention is to provide an antidazzle apparatus for movable bodies capable of not hiding something a user wants to see while dimming sunlight even when something the user wants to see lies in the same direction as the sun does.

According to an aspect of the present invention, an antidazzle apparatus for a movable body is provided as follows. A first dimmer portion is movable vertically and laterally relative to a user located in the movable body and positioned on a straight line linking a user's right eye and a sun. A second dimmer portion is movable vertically and laterally relative to the user and positioned on a straight line linking a user's left eye and the sun. A size of the first dimmer portion and a size of the second dimmer portion are determined to allow the first dimmer portion and second dimmer portion to interpose a non-overlapped portion therebetween.

Under the above structure, one of two dimmer portions is positioned on a straight line linking a user's right eye and the sun, and the other dimmer portion is positioned on a straight line linking the user's left eye and the sun. Thus, sunlight incident on the eyes can be dimmed. At this time, the sun is located infinitely far away from the user. The straight line extending from one of the user's eyes and passing through the dimmer portion positioned between the eye and the sun and the straight line extending from the other user's eye and passing through the dimmer portion positioned between the eye and the sun are thereby parallel to each other.

Entities (for example, the next traffic signal and pedestrians) a user wants to see are located closer to the user than the sun is. Therefore, when the user sees the entities, the lines of sight from the user's eyes are converged on each entity but are not parallel to each other. Moreover, the two dimmer portions do not overlap but have a gap between them. Therefore, assuming that an entity the user wants to see lies in the same direction as the sun does, when the user sees the entity he/she wants to see, at least one of the lines of sight from the right and left eyes passes through the gap between the two dimmer portions. Consequently, even when something the user wants to see lies in the same direction as the sun does, something the user wants to see will not be hidden while sunlight is dimmed for the user.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
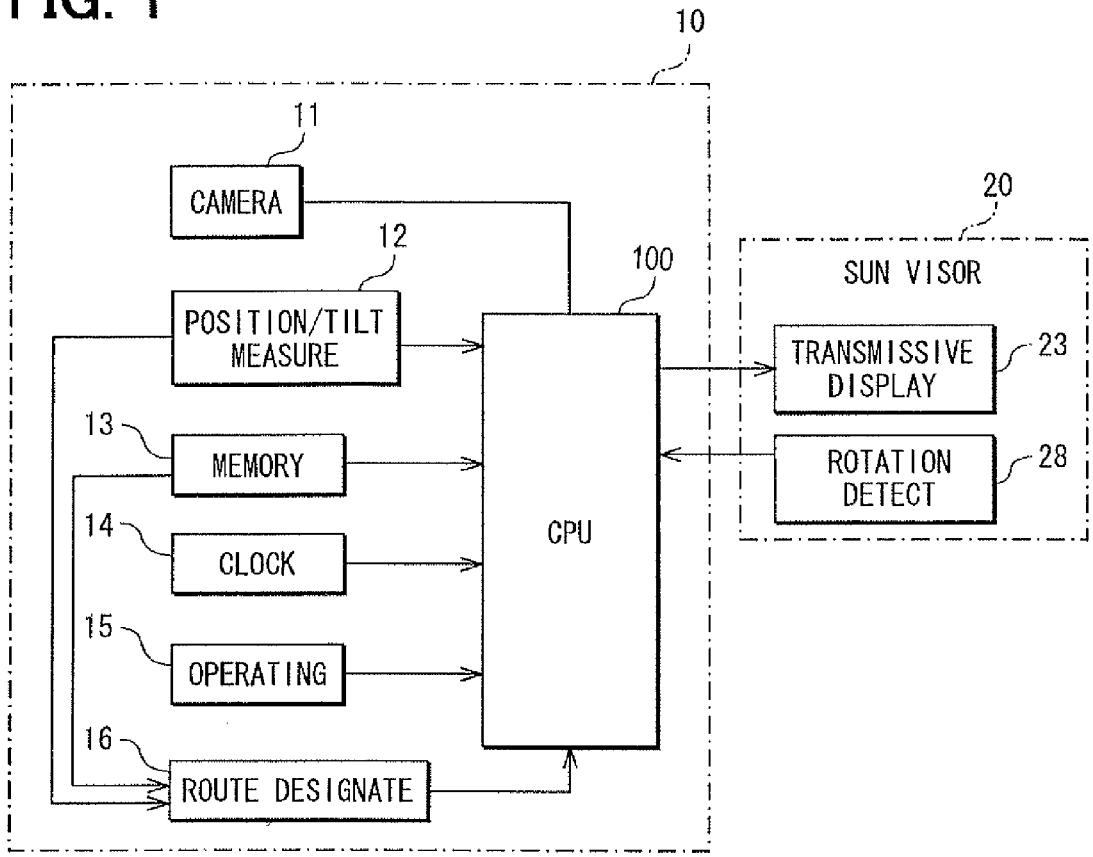
FIG. 1 is a block diagram showing a configuration of an antidazzle apparatus for movable bodies as an example in accordance with an embodiment of the present invention.

A block diagram in FIG. 1 shows a configuration of an antidazzle apparatus for vehicles as an example in accordance with an embodiment of the present invention. The antidazzle apparatus for vehicles shown in FIG. 1 includes (i) a sun visor 20 that has the transmittance of any portions thereof decreased through electrical control and thus has dimmer portions 30 (see FIG. 4) formed therein, and (ii) an antidazzle controller 10 that supplies a signal with which the positions of the dimmer portions 30 are controlled.

The antidazzle controller 10 includes a camera 11 that is located above ahead of a driver in order to image a driver's face (or to take an image of a face of the driver), a position/tilt-of-vehicle measuring instrument 12, a memory unit 13 in which road map data and the orbit of the sun are stored, a clock 14, an operating unit 15, a route designation unit 16, and a central processing unit (hereinafter, CPU) 100 connected to these components.

The sun visor 20 includes a transmissive display 23 and internally includes an angle-of-rotation detector 28. The sun visor 20 is substituted for a sun shade (an ordinary sun visor) located on the ceiling of a vehicle compartment of an ordinary vehicle in front of a driver seat.

Figure 2:
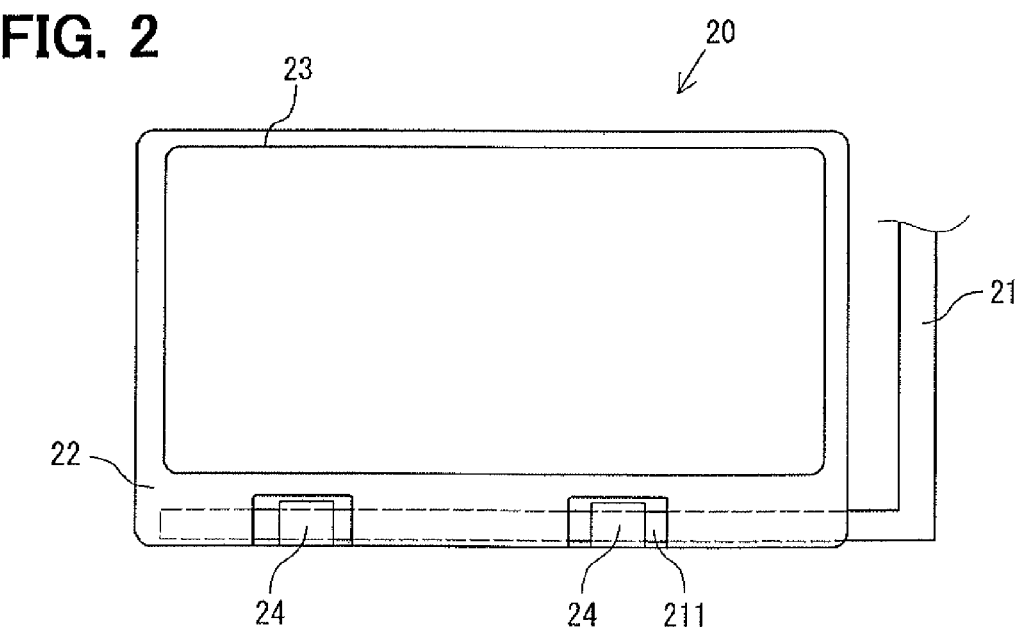
FIG. 2 schematically shows a structure of a sun visor.

FIG. 2 schematically shows a structure of the sun visor 20. The sun visor 20 can be rotated about a vertical axis and a horizontal axis by a mechanism identical to the mechanism associated with an ordinary sun visor disposed above a driver seat in an ordinary vehicle.

The sun visor 20 includes (i) an L-shaped support shaft 21, an upper end of which is fixed to the ceiling of the vehicle compartment so that the support shaft 21 can be turned, (ii) a frame member 22 having one side thereof fixed to a horizontal shaft portion 211 of the support shaft 21, and (iii) the transmissive display 23 mounted in the frame member 22. The frame member 22 and the transmissive display 23 mounted in the frame member 22 can be turned about the horizontal shaft portion 211 of the support shaft 21. Moreover, part of the frame member 22 is notched, and the horizontal shaft portion 211 of the support shaft 21 is partly bared. The bared parts of the horizontal shaft portion 211 are held in respective holding members 24 fixed to the ceiling of the vehicle compartment so that the bared parts can be detached from the respective holding members. The angle-of-rotation detector 28 detects an angle of rotation by which the frame member 22 and the transmissive display 23 integrated with the frame member 22 are rotated above the horizontal shaft portion 211.

The transmissive display 23 has the transmittance of any portions thereof varied using a liquid crystal panel or any other electrical control means. The transmittance of the transmissive display 23 can be varied within a range from a level at which the transmissive display is substantially transparent, to a level at which the transmissive display nearly perfectly intercepts sunlight.

When a liquid crystal panel is adopted as the transmissive display 23, the liquid crystal panel has a structure described below. Namely, the liquid crystal panel includes two transparent plates and has a liquid crystal sealed between the two transparent plates. The transparent plates have numerous electrodes formed lengthwise and broadwise. A thin-film transistor is disposed at each of intersections between sets of electrodes. A voltage is selectively applied to the numerous electrodes, and a voltage applied to each cell is controlled by the thin-film transistor disposed at each of the intersections between the sets of electrodes. Thus, the selected position on the liquid crystal is driven in order to vary the transmittance of light. Incidentally, the transmissive display 23 is not limited to the liquid crystal panel but may be any display as long as the display has an electro-optic dimming function such as an electrochromic device.

Referring back to FIG. 1, the position/tilt-of-vehicle measuring instrument 12 includes one or more of a geomagnetic sensor that detects an absolute azimuth of a vehicle, a gyroscope that detects a relative azimuth of the vehicle, a distance sensor that detects a mileage of the vehicle, and a global positioning system (GPS) receiver for a GPS that measures the position of the vehicle on the basis of radio waves received from satellites. The position/tilt-of-vehicle measuring instrument 12 measures the position of the vehicle on the basis of signals produced by the sensors and others. Moreover, the position/tilt-of-vehicle measuring instrument 12 includes a known tilt angle sensor and measures a tilt angle of the vehicle on the basis of a signal produced by the tilt angle sensor.

The clock 14 not only indicates a time instant but also measures a date. The operating unit 15 includes mechanical switches or touch-sensitive switches integrated into a predetermined display. A driver who is a user of the antidazzle apparatus uses the operating unit 15 to enter various commands that are transferred to the antidazzle controller 10.

The route designation unit 16 designates a route leading to a destination on the basis of the current position of a vehicle measured by the position/tilt-of-vehicle measuring instrument 12, the road map data stored in the memory unit 13, and a designated destination.

Figure 3:
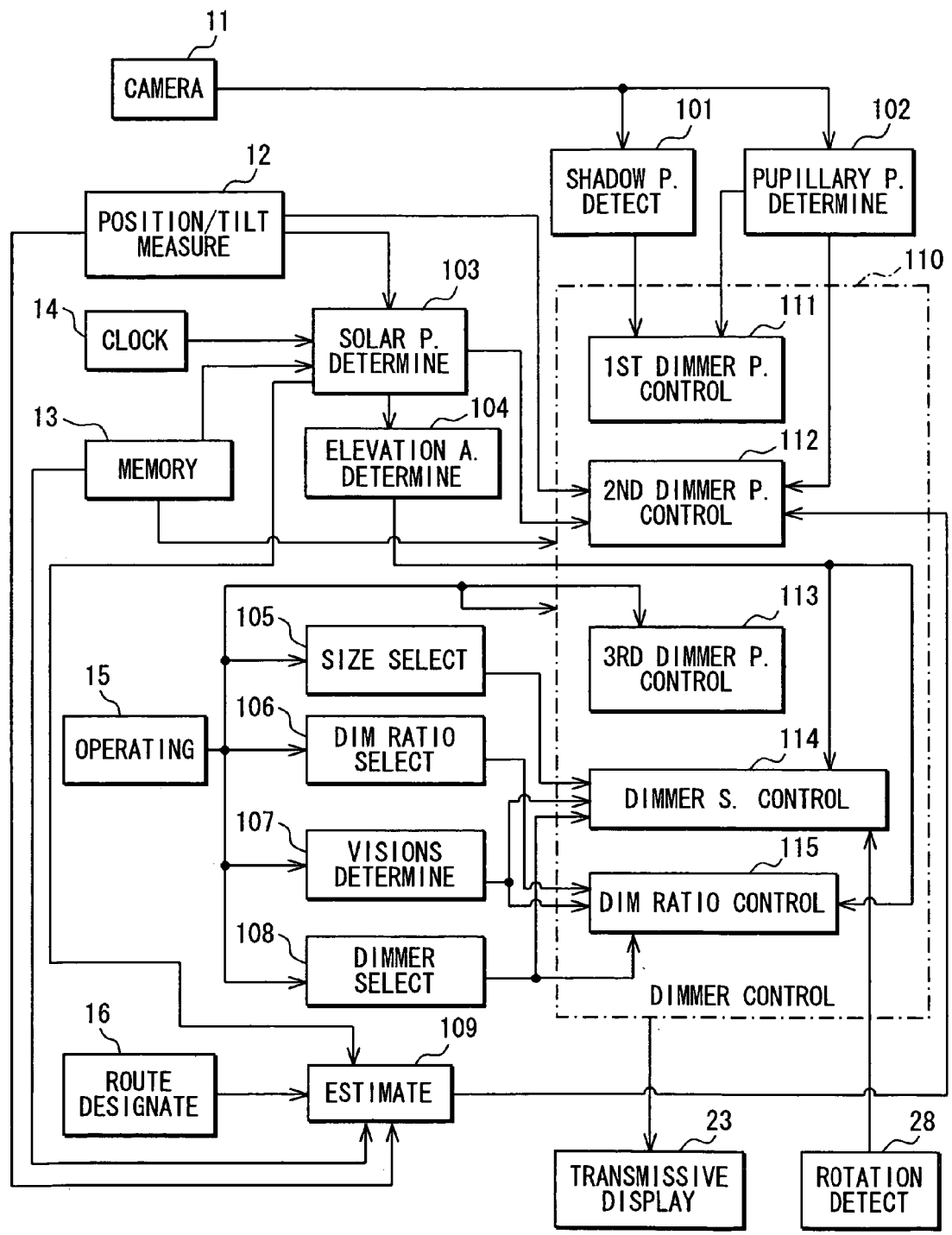
FIG. 3 is a block diagram showing control functions included in a CPU.

FIG. 3 is a block diagram showing the control facilities included in the CPU 100. The CPU 100 includes various pieces of means shown in FIG. 3. The pieces of means will be described below.

A positions-of-shadows detecting means 101 analyzes an image picked up by the camera 11 and detects the positions of shadows formed on a driver's face by dimmer portions 30R and 30L formed in the transmissive display 23 by a dimmer portions control means 110 that will be described later.

A pupillary positions determining means 102 analyzes an image picked up by the camera 11 and determines the positions of the driver's right and left pupils.

A solar position determining means 103 determines a current solar position on the basis of the current position of the vehicle measured by the position/tile-of-vehicle measuring instrument 12, a current date and time instant measured by the clock 14, and a solar orbit stored in the memory unit 13. Moreover, an angle-of-elevation determining means 104 determines a solar angle of elevation on the basis of information on the current solar position determined by the solar position determining means 103.

A size selecting means 105 selects based on a selection signal transferred from the operating unit 15 whether the size of the dimmer portions 30R and 30L is changed based on the solar angle of elevation determined by the angle-of-elevation determining means 104 or the size of the dimmer portions 30R and 30L is set to a predetermined size designated irrespective of the solar angle of elevation. The size selecting means 105 transmits the result of the selection to a size-of-dimmer portions control means 114.

A dim ratio selecting means 106 selects based on a selection signal transferred from the operating unit 15 whether the dim ratio to be attained by the dimmer portions 30R and 30L is changed based on the solar angle of elevation determined by the angle-of-elevation determining means 104 or the dim ratio is set to a predetermined maximum dim ratio. The dim ratio selecting means 106 transmits the result of the selection to a dim ratio control means 115.

A visions determining means 107 determines the driver's right and left visions on the basis of a signal transferred from the operating unit 15, and transmits the visions to the size-of-dimmer portions control means 114 and the dim ratio control means 115.

A dimmer portions selecting means 108 selects based on a selection signal transferred from the operating unit 15 whether the size of the dimmer portions 30R and 30L and the dim ratio to be attained thereby are changed based on the driver's visions or are set to a predetermined size and a predetermined dim ratio respectively that are designated irrespective of the visions. The dimmer portions selecting means 108 then transmits the results of the selection to the size-of-dimmer portions control means 14 and the dim ratio control means 115 respectively.

An estimating means 109 infers a future route for the vehicle from the route for the vehicle designated by the route designation unit 16 and the current position of the vehicle measured by the position/tilt-of-vehicle measuring instrument 12. Furthermore, the estimating means 109 infers from the future route and the current solar position determined by the solar position determining means 103 whether after the advancing direction of the vehicle is changed, the vehicle approaches a point where it receives dazzling sunlight, that is, whether the advancing direction of the vehicle agrees with a direction facing the sun.

Figure 4:
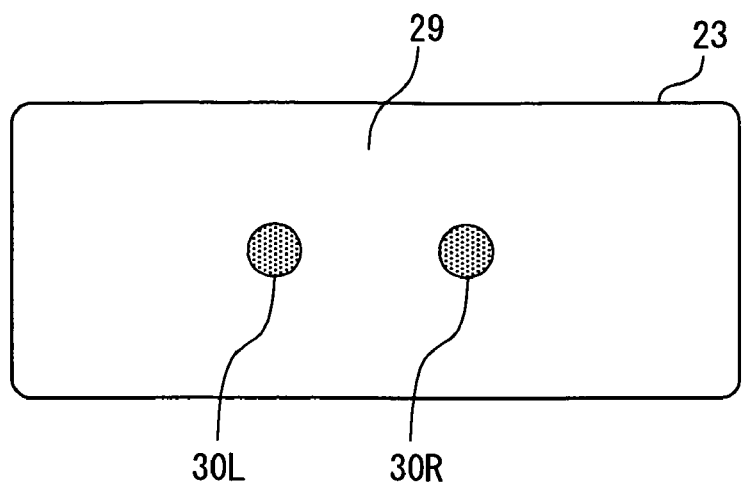
FIG. 4 shows a transmissive display viewed from the position of a driver's face.
Figure 5:
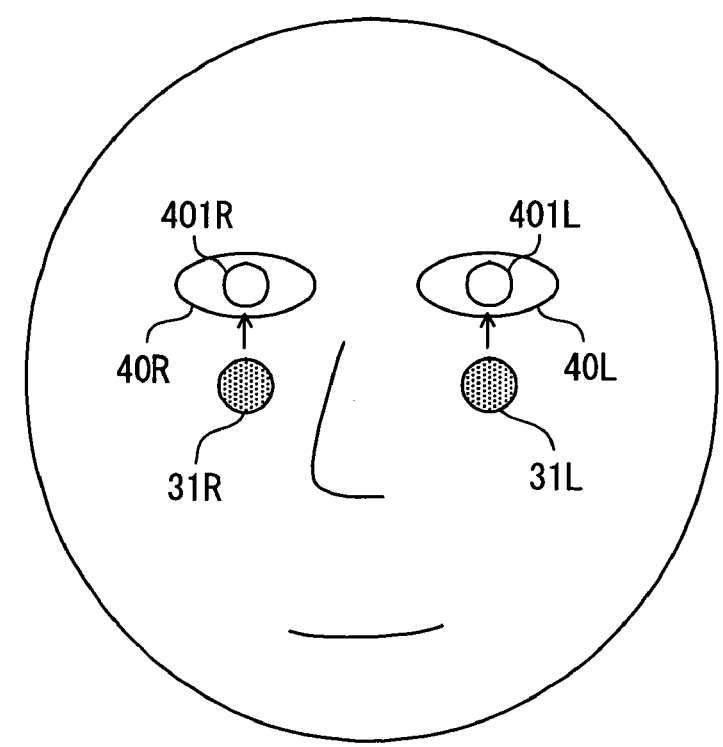
FIG. 5 illustratively shows a driver's face having shadows of dimmer portions formed thereon.
Figure 6:
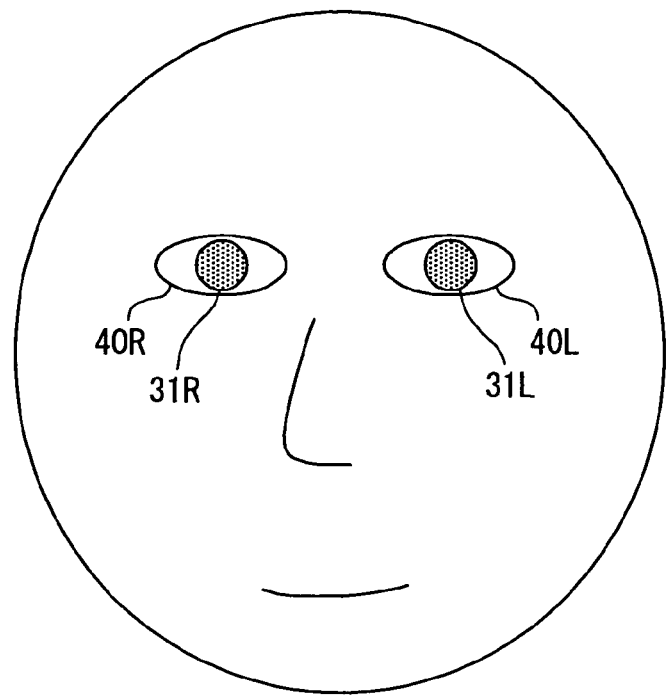
FIG. 6 shows the driver's face on which the shadows of the dimmer portions, of which positions are changed from the ones shown in FIG. 5, coincide with the pupils of the driver's eyes respectively.

A dimmer portions control means 110 transmits an electric signal to the transmissive display 23 so that the two right and left circular dimmer portions 30R and 30L will be, as shown in FIG. 4, formed in the transmissive display 23. The dimmer portions control means 110 controls the positions of the dimmer portions 30R and 30L and the size thereof. FIG. 4 shows the transmissive display 23 viewed from the position of a driver's face (the same applies to FIG. 9 and FIG. 10 in conjunction with which a description will be made later).

In FIG. 4, the distance between the centers of the two dimmer portions 30R and 30L is set to, for example, 6 cm so that the distance will be equal to the distance between the right and left pupils of an average human being. Moreover, the initial value of the radius of the dimmer portions 30R and 30L is set to, for example, 1 cm that is a bit larger than the radius of an average human pupil. Moreover, the portion of the transmissive display 23 other than the dimmer portions 30R and 30L thereof is a transparent portion 29.

Referring back to FIG. 3, the dimmer portions control means 110 includes a first positions-of-dimmer portions control means 111, a second positions-of-dimmer portions control means 112, a third positions-of-dimmer portions control means 113, a size-of-dimmer portions control means 114, and a dim ratio control means 115.

The first positions-of-dimmer portions control means 111 controls the positions of the dimmer portions 30R and 30L so that the positions of the shadows of the dimmer portions 30R and 30L detected by the positions-of-shadows detecting means 101 will be superimposed on the positions of the driver's right and left pupils determined by the pupillary positions determining means 102.

The second positions-of-dimmer portions control means 112 geometrically calculates the position of the driver's left pupil relative to the sun on the basis of the current solar position determined by the solar position determining means 103 and the position of the driver's left pupil determined by the pupillary positions determining means 102, and positions the dimmer portion 30L on a straight line linking the current solar position and the position of the driver's left pupil. Likewise, the second positions-of-dimmer portions control means 112 positions the dimmer portion 30R on a straight line linking the current solar position and the position of the driver's right pupil.

The third positions-of-dimmer portions control means 113 shifts the positions of the two dimmer portions 30R and 30L on the basis of a moving direction signal sent from the operating unit 15.

Positional controls of the dimmer portions 30 are extended by the first, second, and third pieces of positions control means in response to a predetermined dimmer portions production signal sent from the operating unit 15. In addition, when the estimating means 109 estimates that the vehicle will approach a point where sunlight is dazzling, the second positions-of-dimmer portions control means 112 controls the positions of the dimmer portions 30R and 30L in advance.

Whichever of the first, second, and third pieces of positions control means 111, 112, and 113 should be adopted according to priority is recorded in advance in the memory unit 13. Consequently, the memory unit 13 serves as a priority memory unit.

The priority recorded in the memory unit 13 may be fixed to certain priority or may be determined based on the results of measurement. An example of the priority is such that: the highest priority is given to the third positions-of-dimmer portions control means 113 which reflects the driver's intention; and when the positions-of-shadows detecting means 101 can detect shadows, the second highest priority is given to the first positions-of-dimmer portions control means 111; but when the positions-of-shadows detecting means 101 cannot detect shadows, the second highest priority is given to the second positions-of-dimmer portions control means 112. Even when the priority is fixed to the certain priority, the priority may be modified by manipulating the operating unit 15.

At least one of the first, second, and third pieces of positions control means 111, 112, and 113 shifts the positions of the shadows 31R and 31L of the dimmer portions 30R and 30L respectively from a state in which the shadows 31R and 31L do not coincide with the pupils 401R and 401L of the driver's right and left eyes 40R and 40L to a state in which the shadows 31R and 31L coincide with the driver's right and left pupils 401R and 401L respectively.

Figure 7:
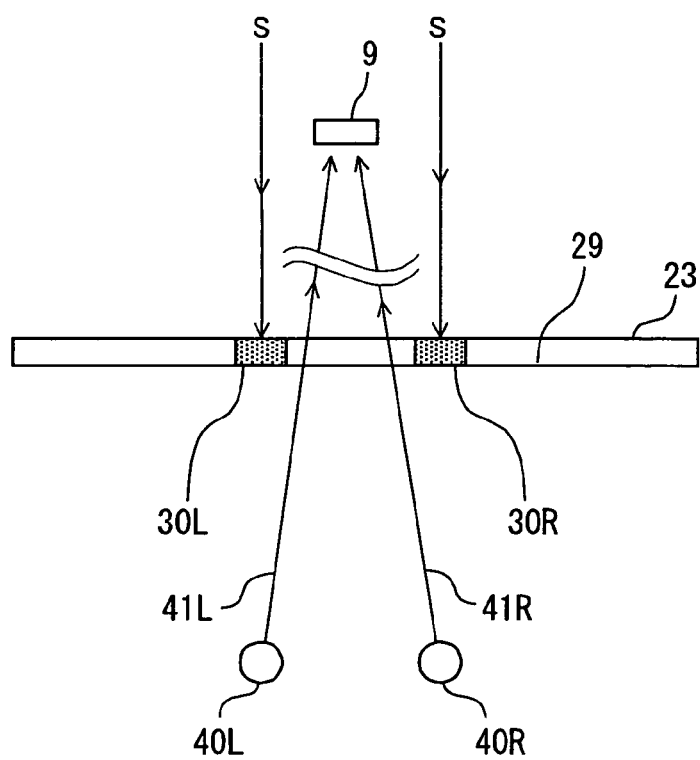
FIG. 7 is an explanatory diagram concerning principles of the present invention showing dimmer portions which are controlled to be in place by pieces of position control means and which are viewed from above a driver.
Figure 8:
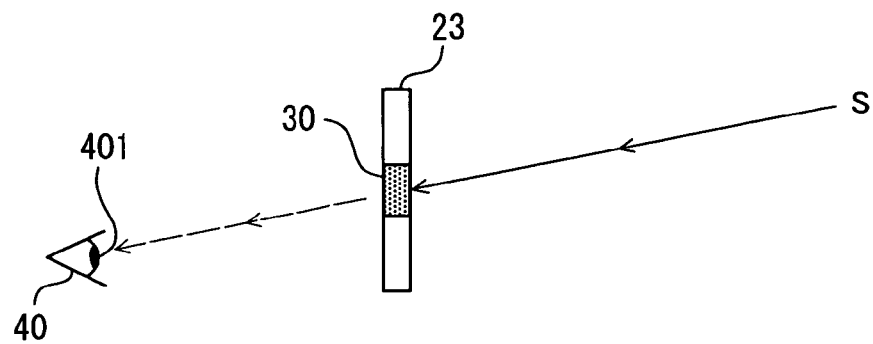
FIG. 8 shows the dimmer portions shown in FIG. 7 and viewed from the flank of a vehicle.

FIG. 7 and FIG. 8 are explanatory diagrams concerning the principles of the present invention. FIG. 7 shows the dimmer portions 30R and 30L which are controlled to be in place by the pieces of positions control means 111, 112, and 113 and which are viewed from above a driver. FIG. 8 shows the dimmer portions 30R and 30L viewed from the flank of the vehicle.

As shown in FIG. 7 and FIG. 8, when the dimmer portions 30R and 30L are controlled to be in place, sunlight S falling on the driver's right and left eyes 40R and 40L are dimmed by the dimmer portions 30R and 30L. Consequently, the sunlight S will not enter the pupils 401 of the driver's eyes 40. Otherwise, when the sunlight S enters the pupils, the sunlight is weak.

On the other hand, the lines of sight 41R and 41L from the right and left eyes 40R and 40L with which the driver sees an entity 9 he/she wants to see (a traffic signal, a pedestrian, or a traffic sign) are not intercepted by the dimmer portions 30R and 30L respectively. The driver can therefore discern the entity 9. In an example shown in FIG. 7, the entity 9 is seen through the space between the two dimmer portions 30R and 30L. At whatever position the entity 9 is located, at least one of the lines of sight 41R and 41L is not intercepted by the dimmer portions 30R and 30L. The entity 9 can therefore be reliably discerned.

Referring back to FIG. 3, the size-of-dimmer portions control means 114 adjusts the longitudinal length of the dimmer portions 30 (in a direction parallel to the short sides of the transmissive display 23) on the basis of an angle θ of the transmissive display 23 with respect to a vertical plane which is detected by the angle-of-rotation detector 28. Namely, when the transmissive display 23 is parallel to the vertical plane, the longitudinal length of the dimmer portions 30 is set to an initial value R that is, for example, 2 cm (radius of 1 cm). Incidentally, the lateral length is set to the same value as the initial value R of the longitudinal length. Therefore, the dimmer portions 30 are circular.

Figure 9:
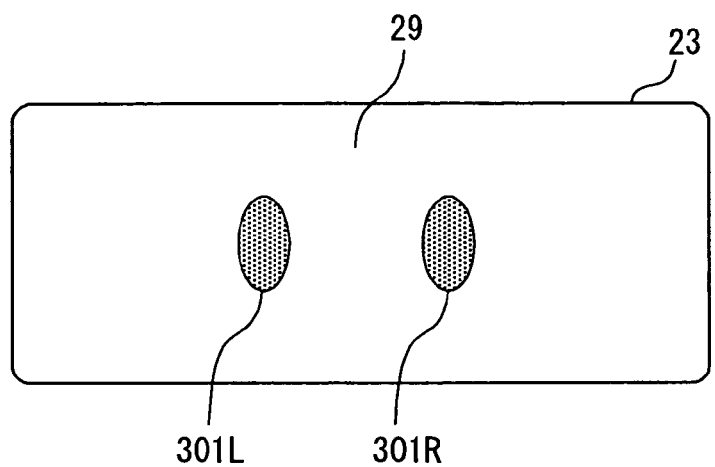
FIG. 9 shows an example of elliptic dimmer portions formed in a transmissive display.

On the other hand, when the transmissive display 23 is not parallel to the vertical plane, the longitudinal length of the dimmer portions 30 is set to R/sin θ. Consequently, when the transmissive display 23 is not parallel to the vertical plane, the dimmer portions 30 have a vertically elongated elliptic shape. FIG. 9 shows an example of elliptic dimmer portions 301R and 301L formed in the transmissive display 23.

When the longitudinal length of the dimmer portions 30 is adjusted according to the angle θ of the transmissive display 23, and when the sun visor 20 is tilted (that is, is not parallel to the vertical plane), the length in the vertical direction of the dimmer portions 30 can be held constant. This makes it possible to reliably dim sunlight incident on the driver's eyes 40.

Furthermore, the size-of-dimmer portions control means 114 adjusts the size of the dimmer portions 30 on the basis of the results of selections provided by the size selecting means 105 and the dimmer portions selecting means 108. Specifically, when the size selecting means 105 selects that the size of the dimmer portions 30 is changed based on a solar angle of elevation, the size-of-dimmer portions control means 114 determines an enlargement ratio for the dimmer portions 30 on the basis of the solar angle of elevation determined by the angle-of-elevation determining means 104 and a first enlargement ratio determinant relationship, which signifies that the enlargement ratio gets larger along with a decrease in the angle of elevation. When the enlargement ratio is 1, the size of the dimmer portions 30 is set to a size determined based on the angle θ of the display 23. Incidentally, the first enlargement ratio determinant relationship may be a relationship signifying that the enlargement ratio continuously changes proportionally to the angle of elevation. When the angle of elevation is equal to or larger than a predetermined angle, the enlargement ratio may be fixed to 1. On the other hand, when the size selecting means 105 selects that the size of the dimmer portions 30 is set to a certain value irrespective of the solar angle of elevation, the size of the dimmer portions 30 is set to the size determined based on the angle θ of the display 23.

Figure 10:
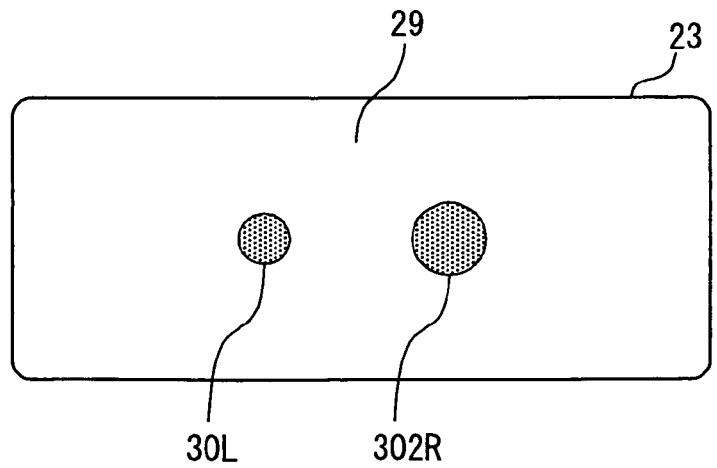
FIG. 10 shows an example in which a right dimmer portion is enlarged based on a driver's vision.

When the dimmer portions selecting means 108 selects that the size of the dimmer portions 30 is changed based on the driver's visions, the enlargement ratio for the dimmer portions 30 is determined based on the driver's right and left visions determined by the visions determining means 107 and a second enlargement ratio determinant relationship, which signifies that the enlargement ratio gets larger along with a rise in the degree of nearsightedness. When the enlargement ratio is 1, the size of the dimmer portions 30 is set to a size determined based on the angle θ of the display 23. Incidentally, the second enlargement ratio determinant relationship may be a relationship signifying that the enlargement ratio continuously changes proportionally to the visions. When the visions are equal to or larger than predetermined visions, the enlargement ratio may be fixed to 1. FIG. 10 shows an example in which the right dimmer portion 302R is enlarged based on the driver's vision.

On the other hand, when the dimmer portions selecting means 108 selects that the size of the dimmer portions 30 is set to a certain value irrespective of the driver's visions, the size of the dimmer portions 30 is set to a size determined based on the angle θ of the display 23.

The dim ratio control means 115 adjusts the dim ratio to be attained by the dimmer portions 30 on the basis of the results of selections provided by the dim ratio selecting means 106 and the dimmer portions selecting means 108. Specifically, when the dim ratio selecting means 106 selects that the dim ratio to be attained by the dimmer portions 30 is changed based on a solar angle of elevation, the dim ratio to be attained by the dimmer portions 30 is determined based on the solar angle of elevation determined by the angle-of-elevation determining means 104 and a first dim ratio determinant relationship, which signifies that the dim ratio gets smaller along with a decrease in the angle of elevation. Incidentally, the first dim ratio determinant relationship may be a relationship signifying that the dim ratio continuously changes proportionally to the angle of elevation. When the angle of elevation is equal to or larger than a predetermined angle of elevation, the dim ratio may be set to a maximum value. On the other hand, when the dim ratio selecting means 106 selects that the dim ratio to be attained by the dimmer portions 30 is set to a certain value irrespective of the solar angle of elevation, the dim ratio to be attained by the dimmer portions 30 is set to the maximum value.

When the dimmer portions selecting means 108 selects that the dim ratio to be attained by the dimmer portions 30 is changed based on the driver's visions, the dim ratio to be attained by the dimmer portions 30 is determined based on the driver's right and left visions determined by the visions determining means 107 and a second dim ratio determinant relationship, which signifies that the dim ratio gets smaller along with a rise in the degree of nearsightedness. Incidentally, the second dim ratio determinant relationship may be a relationship signifying that the dim ratio continuously changes proportionally to the visions. When the visions are equal to or larger than predetermined visions, the dim ratio may be set to the maximum value.

As mentioned above, the two dimmer portions 30 are formed in the transmissive display 23. One of the dimmer portions (dimmer portion 30L) is positioned on a straight line linking the sun and the driver's left eye, and the other dimmer portion (dimmer portion 30R) is positioned on a straight line linking the sun and the driver's right eye. Even when the entity 9 the driver wants to see lies in the same direction as the sun does, while sunlight is dimmed, the entity 9 the driver wants to see can be seen.

Moreover, since the size of the dimmer portions 30R and 30L is as small as a size that is a bit larger than the size of the pupils, a field of view that is large enough can be preserved. Therefore, a driver can drive safely and comfortably, and can discover in the earliest possible stage an incident that a pedestrian existing ahead rushes into the road. Since the distance to the pedestrian existing ahead is much shorter than the distance to the sun, the pedestrian who rushes into the road in the same direction as the direction of the sun will not be intercepted by the dimmer portions 30R and 30L but can be discerned.

Since sunlight is dimmed by the dimmer portions 30R and 30L, the advantage of limited optical fatigue is gained.

(Modification)

The example according to the embodiment of the present invention has been described so far. The present invention is not limited to the example. Examples described below are also encompassed in the technological scope of the present invention, and various modifications can be made within the scope of the invention without a departure from the gist thereof.

Figure 11:
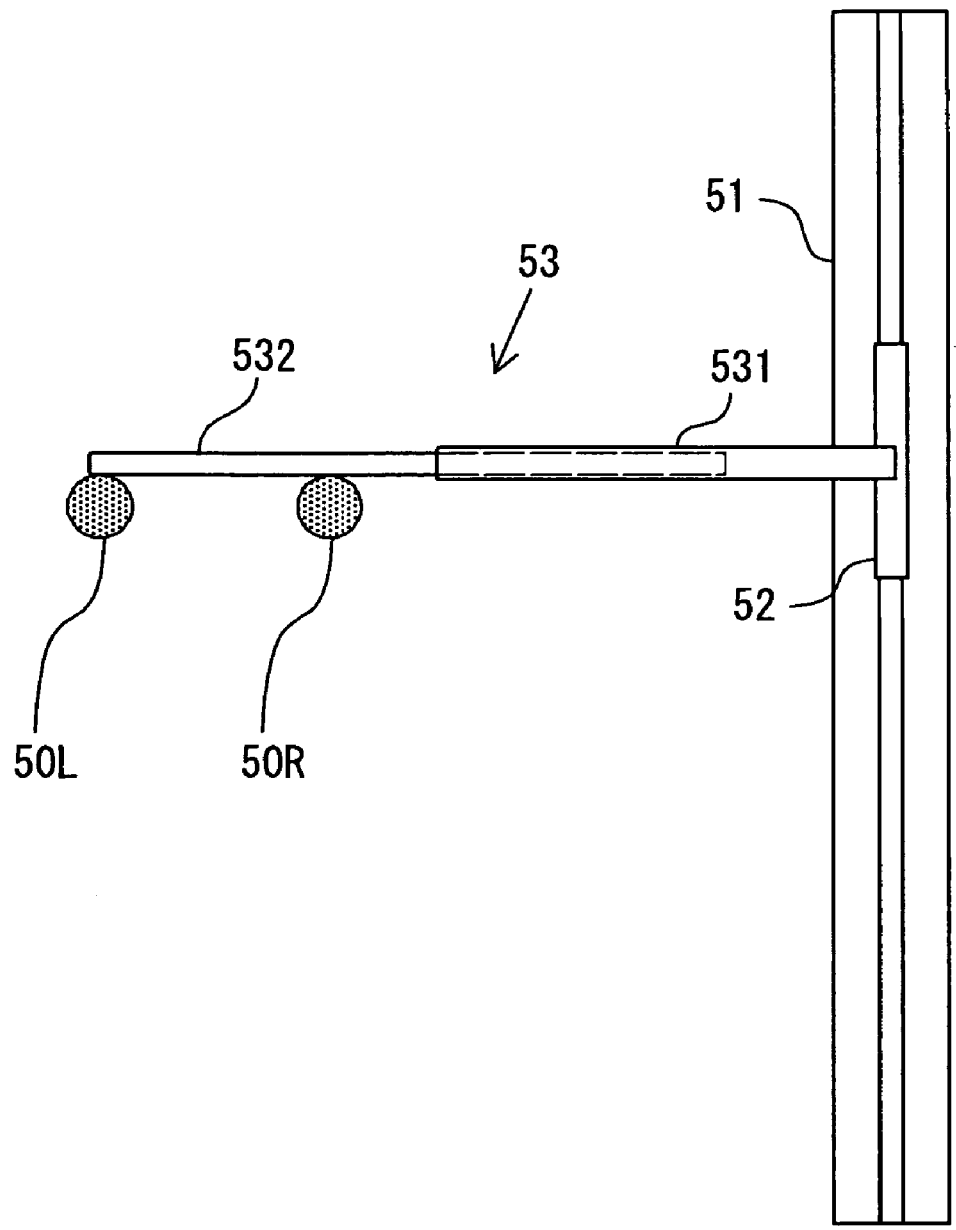
FIG. 11 shows a structure of an antidazzle apparatus for vehicles including two dimmer plates.

For example, the antidazzle apparatus for vehicles of the aforesaid example includes the transmissive display 23, and the two dimmer portions 30 are formed in part of the transmissive display 23. Alternatively, an antidazzle apparatus for vehicles including, as shown in FIG. 11, two dimmer plates 50R and 50L will do. The antidazzle apparatus for vehicles shown in FIG. 11 includes, a guide rail 51 extended vertically, a slider 52 capable of moving vertically along the guide rail 51, and a support rod 53 having one end thereof fixed to the slider 52 and jutting out perpendicularly to the slider 52 (in the direction of the width of a vehicle). The support rod 53 includes a proximal rod 531 fixed to the slider 52 and a distal rod 532 part of which is stored in the proximal rod 531. Owing to the structure, the support rod 53 can contract or stretch by a predetermined magnitude in axial directions.

The dimmer plates 50R and 50L are fixed to the distal portion of the distal rod 532 with a gap, which is identical to the gap between the two dimmer portions 30R and 30L in the aforesaid example, between them. The thus structured antidazzle apparatus shown in FIG. 11 is interposed between a driver seat and a front glass.

The guide rail 51 is vertically relatively long. When the slider 52 is moved vertically along the guide rail 51, the height of the dimmer plates 50R and 50L can be varied in a range from a position near the upper end of the front glass to a position near the lower end of the front glass. Even when the sun is viewed very low, sunlight can be dimmed. Moreover, when sunlight is reflected from a road and routed to driver's eyes, the sunlight (reflected light) can be dimmed. Incidentally, the slider 52 may be vertically movable through manipulations or may be vertically movable through electrical control to be attained using a motor or the like.

The dimmer plates 50R and 50L may be designed to be exchangeable so that multiple sizes (and multiple dim ratios) will be able to be changed.

Moreover, an intermediate rod may be interposed between the proximal rod 531 of the support rod 53 and the distal rod 532 thereof so that the dimmer plate 50R can be fixed to the intermediate rod. In this case, the gap between the two dimmer plates 50R and 50L can be adjusted. Moreover, the transmissive display 23 employed in the aforesaid example may be attached to the support rod 53.

Moreover, the pupillary positions determining means 102 included in the aforesaid example determines pupillary positions by analyzing an image of a driver picked up by the camera 11. Alternatively, the driver may use a mechanical position indicating mechanism to designate the positions of the own pupils, whereby the pupillary positions may be determined. The mechanical position indicating mechanism is conceivably a mechanism including multiple arms and a coupler that couples the multiple arms so that the arms can be turned relative to one another. Moreover, the driver may enter his/her height (or seated height), and the pupillary positions may be determined based on the height. In these cases, the pupillary positions are determined in advance. When the pupillary positions are determined in advance, as long as a vehicle is not tilted in the direction of the width of the vehicle, the pupils are thought to be located at the determined positions. However, when the vehicle is tilted in the direction of the width of the vehicle, the driver often tilts his/her body by a magnitude by which the vehicle is tilted. At this time, the pupillary positions are thought to be different from those attained when the vehicle is driven horizontally. Consequently, when the pupillary positions are determined in advance, the pupillary positions should preferably be corrected based on the tilt of the vehicle in the direction of the width of the vehicle which is measured by the position/tilt-of-vehicle measuring instrument 12.

In the aforesaid example, the angle-of-elevation determining means determines an angle of elevation on the basis of the solar position determined by the solar position determining means 103. In other words, the angle-of-elevation determining means calculates the angle of elevation. Alternatively, a sun imaging camera may be included in order to actually image the sun, whereby the angle of elevation may be determined.

In the aforesaid example, the gap between the right and left dimmer portions 30R and 30L is set to a predetermined constant value but may be able to be adjusted.

Moreover, in the aforesaid example, the shape of the dimmer portions is circular or elliptic. Aside from the shapes, a square or rectangular shape will do. When the number of pixels in the transmissive display 23 is greatly decreased in order to reduce a cost, the square or rectangular shape should be adopted. Moreover, as the transmissive display, a windshield display that is integrated with part or the whole of a front glass (that is, a windshield) and that has the transmittance of any part thereof varied based on an electric signal may be adopted.

Moreover, an audio input device may be adopted as the operating unit 15. Moreover, the antidazzle apparatus in accordance with the aforesaid example is designed for drivers. Needless to say, the antidazzle apparatus may be installed in a passenger seat or used for any other occupant. Moreover, the antidazzle apparatus may be used for a driver of a train or installed in any movable body other than vehicles.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. An antidazzle apparatus for a movable body, the apparatus comprising:
    a first dimmer portion, which is movable vertically and laterally relative to a user located in the movable body and is positioned on a straight line linking a user's right eye and a sun;
    a second dimmer portion, which is movable vertically and laterally relative to the user and is positioned on a straight line linking a user's left eye and the sun;
    a camera to take an image of a face of the user;
    a positions-of-shadows detecting unit configured to analyze an image taken by the camera to detect positions of shadows provided on the face by the first and second dimmer portions under sunlight;
    a pupillary positions determining unit configured to determine positions of user's right and left pupils; and
    a first positions-of dimmer portions control unit configured to control positions of the first and second dimmer portions so that the positions of the shadows are superimposed on the positions of the user's right and left pupils, wherein
    a size of the first dimmer portion and a size of the second dimmer portion are determined to allow the first dimmer portion and second dimmer portion to interpose a non-overlapped portion therebetween.

2. The antidazzle apparatus of claim 1, wherein
    each of the first and second dimmer portions is included in a transmissive display, which is disposed in front of the user, and a transmittance of the each of the first and second dimmer portions is decreased.

3. The antidazzle apparatus of claim 1, wherein
    each of the first and second dimmer portions includes a dimmer plate.

4. The antidazzle apparatus of claim 1, further comprising:
    a position measuring instrument that measures a current position of the movable body;
    a solar position determining unit configured to determine a current solar position based on the current position of the movable body and a current date and time instant;
    a second positions-of-dimmer portions control unit configured to control positions of the first and second dimmer portions based on the current solar position and the positions of the user's right and left pupils.

5. The antidazzle apparatus of claim 1, further comprising:
    an operating unit which the user manipulates so as to move the first and second dimmer portions and which transmits a moving direction signal representing a moving direction; and
    a third positions-of-dimmer portions control unit configured to control positions of the first and second dimmer portions based on the moving direction signal sent from the operating unit.

6. The antidazzle apparatus of claim 1, further comprising:
    a position measuring instrument that measures a current position of the movable body;
    a solar position determining unit configured to determine a current solar position based on the current position of the movable body and a current date and time instant;
    a second positions-of-dimmer portions control unit configured to control positions of the first and second dimmer portions based on the current solar position and the positions of the user's right and left pupils;
    an operating unit which the user manipulates so as to move the first and second dimmer portions and which transmits a moving direction signal representing a moving direction;
    a third positions-of-dimmer portions control unit configured to control positions of the first and second dimmer portions based on the moving direction signal sent from the operating unit; and
    a priority memory unit that stores a priority order to indicate which is preferentially used among at least two of the first positions-of-dimmer portions control unit, the second positions-of-dimmer portions control unit, and the third positions-of-dimmer portions control unit.

7. The antidazzle apparatus of claim 1, wherein
    the pupillary positions determining unit analyzes an image taken by the camera so as to detect the positions of the user's tight and left eyes.

8. The antidazzle apparatus of claim 2, wherein
    the transmissive display is allowed to rotate about an axis which is parallel with a line linking the user's tight eye and the left eye.

9. The antidazzle apparatus of claim 8, wherein,
    of each of the first and second dimmer portions, a length perpendicular to the axis gets larger along with an increase in an angle of the transmissive display with respect to a vertical plane containing the axis.

10. The antidazzle apparatus of claim 2, further comprising:
    an angle-of-elevation determining unit configured to determine a solar angle of elevation; and
    a size-of dimmer portions control unit configured to increase the size of each of the first and second dimmer portions along with a decrease in the solar angle of elevation.

11. The antidazzle apparatus of claim 10, further comprising
    a size selecting unit configured to select whether a size of each of the first and second dimmer portions is changed based on the solar angle of elevation or is set to a predetermined size designated irrespective of the solar angle of elevation, wherein,
    when the size selecting unit selects the predetermined size as the size of each of the first and second dimmer portions, the size-of-dimmer portions control unit sets the size of each of the first and second dimmer portions to the predetermined size irrespective of the solar angle of elevation.

12. The antidazzle apparatus of claim 10, further comprising
    a dim ratio control unit configured to decrease a dim ratio to be attained by each of the first and second dimmer portions along with a decrease in the solar angle of elevation determined by the angle-of-elevation determining unit.

13. The antidazzle apparatus of claim 12, further comprising
a dim ratio selecting unit configured to select whether the dim ratio is changed based on the solar angle of elevation or is set to a predetermined maximum dim ratio, wherein,
when the dim ratio selecting unit selects the maximum dim ratio as the dim ratio to be attained by each of the first and second dimmer portions, the dim ratio control unit sets the dim ratio to the maximum dim ratio irrespective of the solar angle of elevation.

14. The antidazzle apparatus of claim 2, further comprising:
a visions determining unit configured to determine a vision indicating a degree of nearsightedness of each of the user's right and left eyes based on manipulations performed by the user; and
a dimmer portions control unit configured to increase a size of each of the first and second dimmer portions and decreasing a dim ratio to be attained by each of the first and second dimmer portions along with a rise in the degree of nearsightedness.

15. The antidazzle apparatus of claim 14, further comprising
a dimmer portions selecting unit configured to select whether the size and the dim ratio are changed based on the vision or are set to a predetermined size and a predetermined dim ratio which are designated irrespective of the vision, wherein,
when the dimmer portions selecting unit selects the predetermined size and predetermined dim ratio as the size and the dim ratio, the dimmer portions control unit sets the size of each of the first and second dimmer portions and the dim ratio to be attained by each of the first and second dimmer portions thereby to the predetermined size and predetermined dim ratio irrespective of the vision determined by the visions determining unit.

16. The antidazzle apparatus of claim 4, further comprising:
a route designation unit that designates a route along which the movable body is moved; and
an estimating unit configured to infer, from the route of the movable body, the current position of the movable body measured by the position measuring instrument, and the current solar position determined by the solar position determining unit, an incident that the movable body approaches a point where the user is to be dazzled by sunlight, wherein,
when the estimating unit estimates the incident, the second positions-of-dimmer portions control unit allows each of the first and second dimmer portions to move to a predetermined position before the movable body reaches the point.

17. The antidazzle apparatus of claim 2, wherein
the transmissive display is integrated with pail or a whole of a windshield provided in a vehicle as the moving body.

18. An antidazzle apparatus for a movable body, the apparatus comprising:
a first dimmer portion, which is movable vertically and laterally relative to a user located in the movable body and is positioned on a straight line linking a user's right eye and a sun; and
a second dimmer portion, which is movable vertically and laterally relative to the user and is positioned on a straight line linking a user's left eye and the sun;
a positions-of-dimmer portions control unit configured to control positions of the first and second dimmer portions, wherein
a size of the first dimmer portion and a size of the second dimmer portion are determined to allow the first dimmer portion and second dimmer portion to interpose a non-overlapped portion therebetween,
an angle-of-elevation determining unit configured to determine a solar angle of elevation;
a size-of-dimmer portions control unit configured to increase the size of each of the first and second dimmer portions along with a decrease in the solar angle of elevation;
a size selecting unit configured to select whether a size of each of the first and second dimmer portions is changed based on the solar angle of elevation or is set to a predetermined size designated irrespective of the solar angle of elevation, wherein,
each of the first and second dimmer portions is included in a transmissive display, which is disposed in front of the user, and a transmittance of the each of the first and second dimmer portions is decreased,
when the size selecting unit selects the predetermined size as the size of each of the first and second dimmer portions, the size-of-dimmer portions control unit sets the size of each of the first and second dimmer portions to the predetermined size irrespective of the solar angle of elevation.

19. An antidazzle apparatus for a movable body, the apparatus comprising:
a first dimmer portion, which is movable vertically and laterally relative to a user located in the movable body and is positioned on a straight line linking a user's right eye and a sun; and
a second dimmer portion, which is movable vertically and laterally relative to the user and is positioned on a straight line linking a user's left eye and the sun;
a positions-of-dimmer portions control unit configured to control positions of the first and second dimmer portions, wherein
a size of the first dimmer portion and a size of the second dimmer portion are determined to allow the first dimmer portion and second dimmer portion to interpose a non-overlapped portion therebetween;
an angle-of-elevation determining unit configured to determine a solar angle of elevation;
a size-of-dimmer portions control unit configured to increase the size of each of the first and second dimmer portions along with a decrease in the solar angle of elevation; and
a dim ratio control unit configured to decrease a dim ratio to be attained by each of the first and second dimmer portions along with a decrease in the solar angle of elevation determined by the angle-of-elevation determining unit, wherein
each of the first and second dimmer portions is included in a transmissive display, which is disposed in front of the user, and a transmittance of the each of the first and second dimmer portions is decreased.

20. The antidazzle apparatus of claim 19, further comprising
a dim ratio selecting unit configured to select whether the dim ratio is changed based on the solar angle of elevation or is set to a predetermined maximum dim ratio, wherein,
when the dim ratio selecting unit selects the maximum dim ratio as the dim ratio to be attained by each of the first and second dimmer portions, the dim ratio control unit sets the dim ratio to the maximum dim ratio irrespective of the solar angle of elevation.

21. An antidazzle apparatus for a movable body, the apparatus comprising:
a first dimmer portion, which is movable vertically and laterally relative to a user located in the movable body and is positioned on a straight line linking a user's right eye and a sun; and
a second dimmer portion, which is movable vertically and laterally relative to the user and is positioned on a straight line linking a user's left eye and the sun;
a positions-of-dimmer portions control unit configured to control positions of the first and second dimmer portions, wherein
a size of the first dimmer portion and a size of the second dimmer portion are determined to allow the first dimmer portion and second dimmer portion to interpose a non-overlapped portion therebetween;
a visions determining unit configured to determine a vision indicating a degree of nearsightedness of each of the user's right and left eyes based on manipulations performed by the user; and
a dimmer portions control unit configured to increase a size of each of the first and second dimmer portions and decreasing a dim ratio to be attained by each of the first and second dimmer portions along with a rise in the degree of nearsightedness, wherein
each of the first and second dimmer portions is included in a transmissive display, which is disposed in front of the user, and a transmittance of the each of the first and second dimmer portions is decreased.

22. The antidazzle apparatus of claim 21, further comprising
a dimmer portions selecting unit configured to select whether the size and the dim ratio are changed based on the vision or are set to a predetermined size and a predetermined dim ratio which are designated irrespective of the vision, wherein,
when the dimmer portions selecting unit selects the predetermined size and predetermined dim ratio as the size and the dim ratio, the dimmer portions control unit sets the size of each of the first and second dimmer portions and the dim ratio to be attained by each of the first and second dimmer portions thereby to the predetermined size and predetermined dim ratio irrespective of the vision determined by the visions determining unit.

23. An antidazzle apparatus for a movable body, the apparatus comprising:
a first dimmer portion, which is movable vertically and laterally relative to a user located in the movable body and is positioned on a straight line linking a user's right eye and a sun; and
a second dimmer portion, which is movable vertically and laterally relative to the user and is positioned on a straight line linking a user's left eye and the sun;
a position measuring instrument that measures a current position of the movable body;
a solar position determining unit configured to determine a current solar position based on the current position of the movable body and a current date and time instant;
a pupillary positions determining unit configured to determine positions of user's right and left pupils;
a second positions-of-dimmer portions control unit configured to control positions of the first and second dimmer portions based on the current solar position and the positions of the user's right and left pupils;
a route designation unit that designates a route along which the movable body is moved; and
an estimating unit configured to infer, from the route of the movable body, the current position of the movable body measured by the position measuring instrument, and the current solar position determined by the solar position determining unit, an incident that the movable body approaches a point where the user is to be dazzled by sunlight, wherein,
a size of the first dimmer portion and a size of the second dimmer portion are determined to allow the first dimmer portion and second dimmer portion to interpose a non-overlapped portion therebetween,
when the estimating unit estimates the incident, the second positions-of-dimmer portions control unit allows each of the first and second dimmer portions to move to a predetermined position before the movable body reaches the point.

* * * * *